Dec. 26, 1950     B. C. DAY     2,535,199
GEAR HOLDING DIAPHRAGM CHUCK
Filed May 28, 1947     2 Sheets-Sheet 1
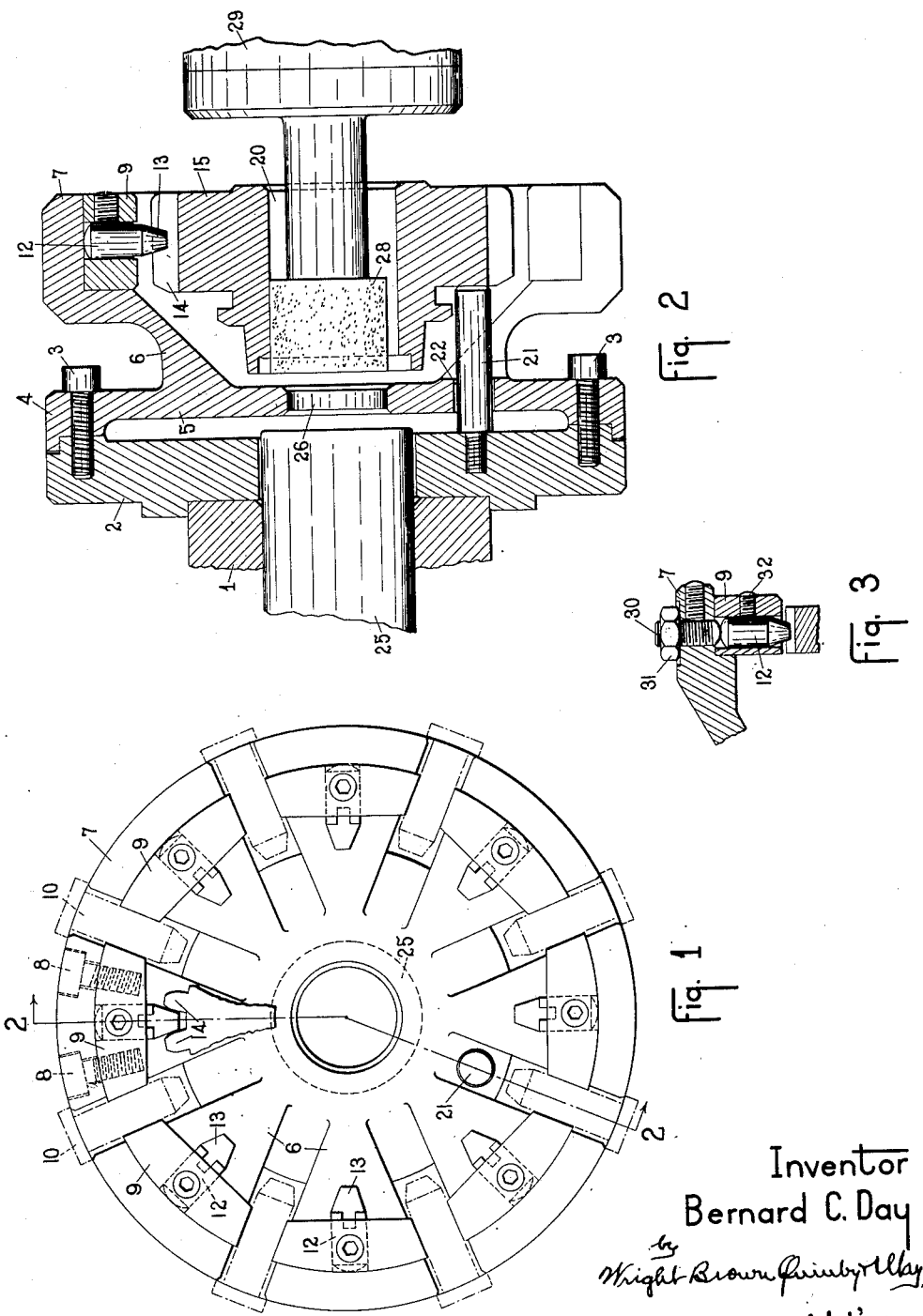
Inventor
Bernard C. Day
by Wright Brown Quimby & May
Att'ys Dec. 26, 1950  B. C. DAY  2,535,199
GEAR HOLDING DIAPHRAGM CHUCK
Filed May 28, 1947  2 Sheets-Sheet 2

Inventor
Bernard C. Day
by
Wright Brown Quinby & May
Attys

Patented Dec. 26, 1950

2,535,199

UNITED STATES PATENT OFFICE 2,535,199

GEAR HOLDING DIAPHRAGM CHUCK

Bernard C. Day, Springfield, Vt., assignor to Bryant Chucking Grinder Company, Springfield, Vt., a corporation of Vermont Application May 28, 1947, Serial No. 751,071

10 Claims. (Cl. 279—1)

1

This invention relates to diaphragm chucks and has for an object to provide a chuck of this type suitable for supporting gears by engagement at their pitch circles so that their central bores are properly positioned for accurate finishing as by grinding. To this end the work-engaging fingers of the diaphragm are each provided with elements for engagement between the teeth of the gear at or closely adjacent to the pitch circle, means being provided for accurately holding the fingers spaced angularly during the settings of the gear-engaging elements.

For a complete understanding of this invention, reference may be had to the accompanying drawings in which Figure 1 is a front end elevation of a chuck embodying the invention, a small portion of a gear supported by the chuck being shown, and the setting up spacers between the fingers being shown in dotted lines.

Figure 2 is a sectional view on line 2—2 of Figure 1, the gear being illustrated, and also an internal grinding wheel grinding the gear bore.

Figure 3 is a sectional detail similar to a portion of Figure 2, but to a smaller scale and showing a modification.

Figure 5:
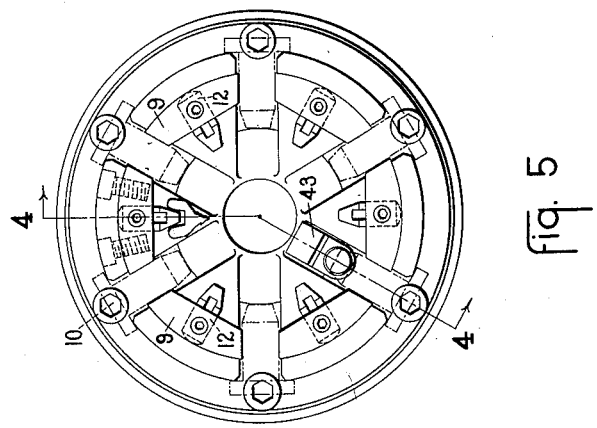
Figure 5 is a front end elevation of the chuck shown in Figure 4 and to a larger scale.

Referring first to Figures 1 and 2, at 1 is shown a spindle nose portion of a rotary work spindle. To this nose portion may be secured in any suitable manner, a supporting member formed as a circular face plate 2 arranged coaxial with the spindle. To the outer margin of this face plate is secured, as by bolts 3, the marginal extended portion 4 of a diaphragm 5, the central portion of the diaphragm being normally spaced from the outer face of the face plate. This diaphragm 5 is concentric with and perpendicular to the axis of the spindle and has a plurality of angularly spaced fingers 6 integral therewith and projecting forwardly and outwardly therefrom. The outer ends of these fingers 6 have flanges 7 extending substantially parallel to the axis of the spindle, which is also the axis of the chuck, and against the inner faces of each of these flanges 7 may be secured, as by screws 8, a block 9. The screws 8 are threaded into the block 9 and pass through enlarged openings in the flange 7 so as to permit some adjustment of the blocks 9 with respect to the flanges 7.

2

For proper assembly of the blocks 9, a plurality of locating pins 10 may be placed between the finger flanges 7 and between the blocks 9, these locating pins when all are in position, angularly spacing the blocks 9 throughout the entire set of fingers 6, thus rigidly locating these blocks 9 in proper angularly spaced relation about the axis of the chuck. When so located, the screws 8 are tightened to rigidly fix the blocks in such positions.

Each of the blocks carries a pin 12 having an inner tapered extremity 13 which is arranged to pass between adjacent teeth 14 of a gear 15, which is the work to be clamped in the chuck. The tapered portion 13 engages opposite sides of adjacent teeth, as shown in Figure 1, at or closely adjacent to the pitch circle. The tapers 13 of the pins 12 are held in the same relation to the rounded faces 16 at the opposite ends of these pins, and these rounded ends engage the ground inner surfaces of the finger flanges 7. This brings the taper portions 13 of all the pins at the same distance from the axis of the chuck to properly center the gears. It is necessary not only to space the tooth-engaging elements in angular relation, but also to have the contact points of the work-engaging means concentric around the axis of the chuck. The radius of curvature of the outer ground face 16 of each of the pins is equal to or smaller than that of the inner ground surface of the finger flanges 7. The contacts between the outer ends of the pins 12 and the flanges 7 position these pins positively so that they cannot be slipped back in the blocks 9 as might be the case if they were held by their clamping screws alone. Thus the gear is held by the pins 13 in correct position so that when the interior bore 20 of the gear is machined, as by grinding, it will be truly concentric to the pitch circle of the gear. The gear is placed in position between the pins 13 when the diaphragm 5 is flexed outwardly so as to separate the pins 12 from the axis, the work piece being pressed backwardly between the pins into contact with one or more stop pins 21 secured in the supporting face plate 2 and projecting through one or more openings 22 in the diaphragm 5. The releasing of the work from the pins 12 may be accomplished by thrusting against the central portion of the diaphragm a release bar 25 which is slidable axially through the spindle and engages the inner face of the diaphragm about the margin of a central hole 26 therein. When the gear has been placed in position against the stop 21, retraction of the bar 25 allows the diaphragm to spring back toward its normal position, bringing the pins 12 inwardly into clamping relation with the gear. In this position the central bore 20 of the gear may be finished concentric with the gear pitch circle as by the use of a grinding wheel 28 carried by a suitable rotary spindle 29 and which may be reciprocated within the bore 20.

In Figure 3 a slight modification is shown in which means are provided for adjusting the pins 12 held within bores substantially radial to the axis of the chuck through the blocks 9, this adjusting means comprising the adjustable screw 30 threaded through the flange 7 and impinging upon the rear end of the pin 12, a lock nut 31 being employed to fix the screw 30 in adjusted position. The pins 12 are then locked in adjusted position as by a set screw 32.

It will be understood that after the pins 12 have been correctly located as on a standard work piece and the blocks 9 have been fixed in position, the spacing pins 10 are removed, these pins 10 not being employed during the operation of the chuck.

Figure 4:
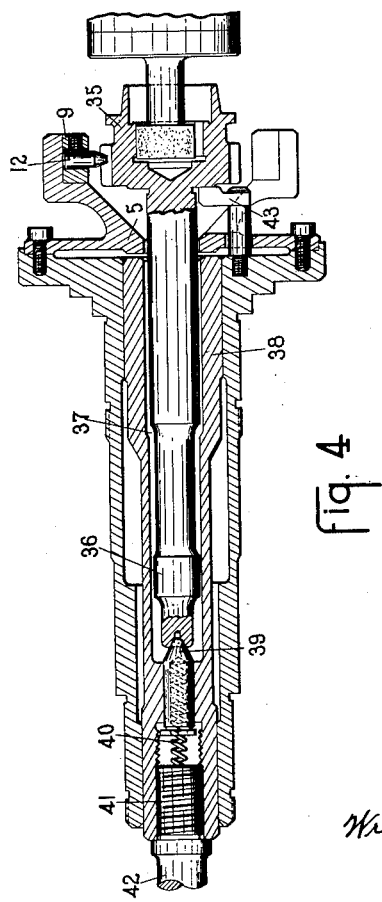
Figure 4 is a view similar to Figure 2, but to a smaller scale and showing a work piece of different form, together with the cooperating parts of the spindle mechanism and chuck.

In Figures 4 and 5, a modification is shown in which the work comprises the gear 35 with an integral shaft extension 36. This shaft extension projects into a central socket 37 in the diaphragm push rod 38 which is formed as a sleeve and the rear end of the shaft extension 36 may be held centered as by a cone center 39 engaging therewith and pressed into contact therewith by the spring 40, which is seated at its rear end against a threaded end 41 of an actuating bar 42 threaded into an internal threaded socket in the rear end of the push rod 38. The spring 40, as shown, extends into a socket in the center 39. The shaft portion 36 is supported out of contact with the inner wall of the socket 37 and extends freely through the diaphragm 5. The back face of the gear portion 35 is pressed rearwardly against the stop 43 while the rear end of the shaft 36 is centered by the cone center 39. The gear portion 35 is engaged by the chuck between its teeth at or adjacent to the pitch circle in the same manner as is illustrated in Figure 1, the gaging pins 12 being first properly spaced by spacing of the blocks 9 by the use of the spacer pins 10 as previously described. Of course here, also, the pins 12 may be adjustably mounted as shown in Figure 3.

From the foregoing description of certain embodiments of this invention, it should be evident to those skilled in the art that various further changes and modifications might be made without departing from its spirit or scope.

I claim:

1. A chuck comprising a supporting member, a diaphragm fixed to said supporting member about its margin and extending perpendicular to and concentric with the axis of rotation of said chuck, a plurality of fingers angularly spaced about said axis and projecting forwardly from said diaphragm, a block adjustably secured to the outer end portion of each finger, and a pin carried by each block and projecting toward said axis and having a tapered inner end portion for engagement between adjacent teeth of a gear held between said pins.

2. A chuck comprising a supporting member, a diaphragm fixed to said supporting member about its margin and extending perpendicular to and concentric with the axis of rotation of said chuck, a plurality of fingers angularly spaced about said axis and projecting forwardly from said diaphragm, a block adjustably secured to the outer end portion of each finger, a pin carried by each block and projecting toward said axis and having a tapered inner end portion for engagement between adjacent teeth of a gear held between said pins, and spacers insertable between the blocks of adjacent fingers to facilitate securing of said blocks to said fingers in accurate angularly spaced relation.

3. A chuck comprising a supporting member, a diaphragm fixed to said supporting member about its margin and extending perpendicular to and concentric with the axis of rotation of said chuck, a plurality of fingers angularly spaced about said axis and projecting forwardly from said diaphragm, a block adjustably secured to the outer end of each finger, a pin carried by and projecting inwardly from each block and having a tapered inner end portion for engagement between adjacent teeth of a gear held between said pins, and means for adjusting the endwise position of each pin.

4. A chuck comprising a supporting member, a diaphragm fixed to said supporting member about its margin and extending perpendicular to and concentric with the axis of rotation of said chuck, a plurality of fingers angularly spaced about said axis and projecting forwardly from said diaphragm, a pin projecting inwardly from the outer portion of each finger and having a tapered inner end portion for engagement between adjacent teeth of a gear held between said pins, said supporting member being tubular, said gear having a coaxial shaft portion extending into the tubular portion of said supporting member, a sleeve in said tubular portion within which said shaft is positioned, and means carried by said sleeve engaging and centering the inner end of said shaft.

5. A chuck comprising a supporting member, a diaphragm fixed to said supporting member about its margin and extending perpendicular to and concentric with the axis of rotation of said chuck, a plurality of fingers angularly spaced about said axis and projecting forwardly from said diaphragm, a pin projecting inwardly from the outer portion of each finger and having a tapered inner end portion for engagement between adjacent teeth of a gear held between said pins, said supporting member being tubular, said gear having a coaxial shaft portion extending into the tubular portion of said supporting member, a push rod coaxial with said supporting member axially movable to impinge on said diaphragm and deflect its central portion and separate said fingers, said push rod having a sleeve portion within which said shaft is positioned, and means carried by said push rod engaging and centering the inner end of said shaft coaxial with said supporting member.

6. A chuck comprising a supporting member, a diaphragm fixed to said supporting member about its margin and extending perpendicular to and concentric with the axis of rotation of said chuck, a plurality of fingers angularly spaced about said axis and projecting forwardly from said diaphragm, said fingers having inner faces accurately ground concentric to said axis, a radial pin having a convex outer end bearing on said inner face of the corresponding finger, the inner ends of said pins being tapered all in the same relation to their outer ends for engagement between adjacent teeth of a gear held between said pins, and means bearing on said concentric finger face for holding said pins to said fingers.

7. A chuck comprising a supporting member, a diaphragm fixed to said supporting member about its margin and extending perpendicular to and concentric with the axis of rotation of said chuck, a plurality of fingers angularly spaced about said axis and projecting forwardly from said diaphragm, said fingers having inner faces accurately ground concentric to said axis, supporting blocks carried by said fingers inwardly of and engaging said concentric faces and adjustable angularly along said faces, and a radial pin carried by each of said blocks and having a convex outer end bearing on said inner face of the corresponding finger, the inner ends of said pins being tapered all in the same relations to their outer ends for engagement between adjacent teeth of a gear held between said pins.

8. A chuck comprising a supporting member, a diaphragm fixed to said supporting member about its margin and extending perpendicular to and concentric with the axis of rotation of said chuck, a plurality of fingers angularly spaced about said axis and projecting forwardly from said diaphragm, a pin projecting inwardly from the outer portion of each finger and having a tapered inner end portion for engagement between adjacent teeth of a gear held between said pins, said supporting member being tubular, said gear having a coaxial shaft portion extending into the tubular portion of said supporting member, a sleeve in said tubular portion within which said shaft is positioned, and a cone center carried by said sleeve for engaging and centering the inner end of said shaft.

9. A chuck comprising a supporting member, a diaphragm fixed to said supporting member about its margin and extending perpendicular to and concentric with the axis of rotation of said chuck, a plurality of fingers angularly spaced about said axis and projecting forwardly from said diaphragm, a pin projecting inwardly from the outer portion of each finger and having a tapered inner end portion for engagement between adjacent teeth of a gear held between said pins, said supporting member being tubular, said gear having a coaxial shaft portion extending into the tubular portion of said supporting member, a sleeve in said tubular portion within which said shaft is positioned, a cone center carried by said sleeve for engaging and centering the inner end of said shaft, and a spring pressing said center against said shaft.

10. A chuck comprising a supporting member, a diaphragm fixed to said supporting member about its margin and extending perpendicular to and concentric with the axis of rotation of said chuck, a plurality of fingers angularly spaced about said axis and projecting forwardly from said diaphragm, an element extending inwardly from the outer portion of each finger and having an inner end portion for engagement between adjacent teeth of a gear held between said elements, said supporting member being tubular, said gear having a coaxial shaft portion extending into the tubular portion of said supporting member, and an element in said tubular portion engaging and centering the inner end of said shaft.

BERNARD C. DAY.

REFERENCES CITED

The following references are of record in the file of this patent:

UNITED STATES PATENTS

| Number | Name | Date |
|---|---|---|
| 1,812,455 | Stowell | June 30, 1931 |
| 2,271,637 | Garrison et al. | Feb. 3, 1942 |
| 2,389,366 | Jones | May 20, 1943 |
| 2,464,507 | Hohwart et al. | Mar. 15, 1949 |
| 2,473,380 | Ljienggnen et al. | June 14, 1949 |